Patented Sept. 14, 1948

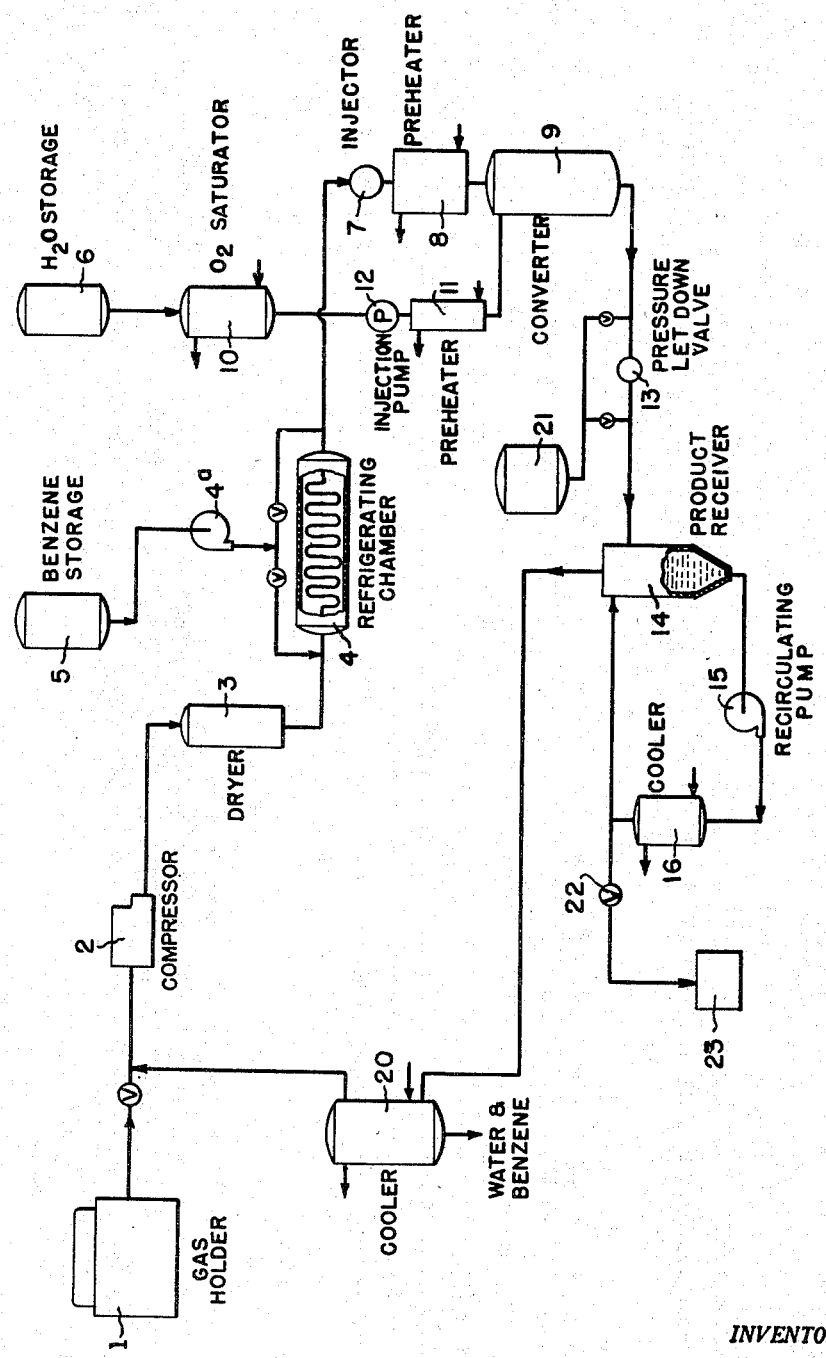

2,449,489

UNITED STATES PATENT OFFICE 2,449,489

PREPARATION OF POLYMERIC ETHYLENE EMULSIONS

Alfred T. Larson, Wilmington, Del., assignor to E. I. du Pont de Nemours & Company, Wilmington, Del., a corporation of Delaware Application July 3, 1947, Serial No. 758,752

6 Claims. (Cl. 260—29.6)

This invention relates to a process for the polymerization of ethylene and is more particularly related to the polymerization of ethylene directly to a product in the emulsified state.

Various methods have been proposed for the polymerization of olefins, such as ethylene, with the principal object of obtaining high molecular weight products for various purposes. Oil-like products of relatively low molecular weight have been prepared from ethylene by polymerization in the presence of boron fluoride and like catalysts while solid products to semisolid high molecular weight products of a polymeric nature have been obtained by effecting the polymerization in the absence of catalysts or in the presence of peroxy-type catalysts, by treatment of ethylene at pressures above 50 atmospheres up to 3000 atmospheres or more. By a similar process, interpolymers of ethylene with other polymerizable organic compounds as well as telomers with ethylene can be prepared and by means of these processes a wide variety of products are available to the art, some of which vary in their molecular weight from oily, low-molecular weight products to solid high-molecular weight products.

Processes are known whereby these polymers and interpolymers of ethylene can be prepared in the form of emulsions in which form the polymers, interpolymers and telomers of ethylene have found many uses in the art. These developed uses require, in many instances, emulsions of these products having definitely prescribed molecular weight characteristics. While the prior art, by and large, teaches various methods of governing the molecular weight of these products, no process is available which simultaneously produces a polymer, interpolymer or telomer of the desired molecular weight and concurrently produces that polymer in the emulsified state.

An object of the present invention is to provide a new process for the polymerization of ethylene in the form of its homopolymer, interpolymer or telomer and in an emulsified or dispersed state. Another object is to provide a process for the preparation of homopolymers, interpolymers and telomers of ethylene of any desired molecular weight and in the emulsified state. A further object is to provide a process whereby ethylene is polymerized in the presence of water and a suitable catalyst under elevated temperatures and pressures and prior to discharging the polymer from the reaction zone, it is emulsified and thereafter discharged from that zone as an emulsion. Other objects and advantages of the invention will hereinafter appear.

In the preparation of high molecular weight polymers of olefinic hydrocarbons containing an ethylenic linkage and more especially in the homopolymerization, interpolymerization and telomerization of ethylene, in the presence of polymerization catalysts or if very high pressures are used in the absence of added catalysts, the reaction is preferably conducted under superatmospheric pressures. The ethylene or other olefinic hydrocarbon may be brought to reaction pressure by first compressing the gas to approximately its critical pressure, and for ethylene preferably to a pressure between 20 and 150 atmospheres, subsequently cooling the thus compressed gases to a temperature sufficient to liquefy them, that is, for ethylene, to a temperature between −35 and +5° C., thereby converting the gas to a liquid, and thereafter compressing the resulting liquid to the desired reaction pressure.

It has been known that certain addition agents greatly improve the properties of ethylene polymers. For example, the addition of benzene, chlorobenzene, and isooctane while they do not appear to enter into the reaction their presence during the reaction considerably improves the properties of the product. Moreover, other addition agents may be used which will react with the ethylene to form interpolymers such as the polymerizable organic compounds or those addition agents may be used which, although saturated, react to give valuable modification products of ethylene. Furthermore, if, as in the process of this invention, emulsions are to be prepared, the medium in which the polymer is to be suspended is added to the ethylene with or without the aforesaid addition agents.

According to this invention the introduction of the emulsifying medium and the liquid addition agents, if used, into the reaction, is facilitated by first compressing the ethylene, cooling it to a liquid, and then thoroughly mixing the addition agent with the liquid ethylene. This procedure is especially beneficial in the preparation of emulsions of homopolymers, interpolymers and telomers of ethylene for by this method these valuable products may be obtained having consistently uniform properties and of substantially any desired molecular weight. Such products have been obtainable heretofore only with great difficulty or not at all.

The invention will be more readily understood by reference to the attached diagrammatic drawing, wherein ethylene from gas holder 1 is drawn through an oil lubricated compressor 2 and its pressure increased to from 20 to 150 atmospheres. Inasmuch as ethylene will contain some moisture, it is passed through a drier 3, containing calcium chloride, solid NaOH or other suitable drying medium, for the removal of the moisture and is then passed into a refrigerating chamber 4 wherein it is cooled to a liquid. Prior to or subsequent to liquefaction in refrigerating chamber 4, benzene or other suitable addition agent such as isooctane, chlorobenzene, etc., or a reactant such as vinyl acetate, vinyl chloracetate, methyl methacrylate, etc., may be introduced, by means of the injector 4a from storage tank 5 into the liquid ethylene. Benzene may be introduced at a rate of approximately 0.05 to 2.0 parts thereof per part of the ethylene. Vinyl acetate and similar polymerizable addition agents may be introduced in equal or greater than equal molecular weight proportions with the ethylene, other addition agents being introduced in suitably controlled amounts. The resulting liquid mixture is then raised in the injector 7 to the pressure of polymerization preferably between 800 to 1500 atmospheres although much higher pressures may be used. The resulting mixture may be then heated to the desired reaction temperature, in preheater 8, i. e. for example, between approximately 50° and 400° C. after which the compressed reaction mixture is introduced directly into the converter 9. Into converter 9 there likewise may be injected 0.1 to 10.0 parts of water per part of the ethylene, the water being transferred from the storage tank 6 to the oxygen saturator 10, is heated in preheater 11 and forced into the converter 9 by means of the injection pump 12. If oxygen is used as the catalyst, the total oxygen at this point should be equivalent preferably to about 20 to about 2000 P. P. M. of the ethylene present. The products issuing from the converter pass through a pressure let-down valve 13 from which they are introduced into the product receiver 14. From the bottom of the product receiver 14 wherein the products and water condense the condensate is drawn by a circulating pump 15 into cooler 16 and back into the top of the product receiver 14. The vapors from the top of receiver 14 are returned to the ethylene stream after cooling in cooler 20 to approximately inlet ethylene temperature, condensed water and benzene being separated from the olefin in cooler 20. The cooled ethylene is then returned to the synthesis with the make-up ethylene stream. The liquid mixture from cooler 16 is bled off and the polymers present separated.

The process above described is very flexible and by alteration of conditions of temperature, pressure and reactants homopolymers, interpolymers and telomers of ethylene having a wide range of molecular weight, can be prepared. Heretofore it has been necessary to remove such polymers from the reaction and in a separate step subject these polymers to suitable conditions whereby they are converted to emulsions. In some instances due inter alia to the tough solid polymers produced, it was not possible to convert them to the emulsified state. A feature of this invention involves forming the emulsions directly irrespective of the physical form of the polymer.

Storage tank 21 holds the solution of dispersing agent in a medium to be used for dispersion. The dispersing agent and emulsifying medium are preferably introduced into the finished product before the pressure let-down valve 13 although a portion may be introduced directly thereafter. The product then passes into the product receiver 14 which is provided with a suitable stirring device and by means of the recirculating pump 15 and cooler 16 a uniform stable emulsion of the product is obtained. This product is discharged through let-down valve 22 to a suitable receptacle 23.

The reaction as broadly described above may be carried out in accord with the invention in any suitable type of converter capable of withstanding the high pressures and it is preferably conducted in one having relatively great length to diameter. The converter may be made of high chromium, low nickel steel such as 18% chromium, 8% nickel or may be made of alloy steel or mild steel lined with a chrome-steel or other suitable metal such as silver, or with other corrosion resisting liners of chromium, porcelain, etc.

The peroxygen-type catalyst which may be employed with the reaction includes molecular oxygen or air which may be present with respect to the olefin in amounts ranging from 5 to 2000 P. P. M. (calculated as oxygen). While oxygen is an excellent catalyst, peroxygen-type catalysts may be used, with or without oxygen, such catalysts including dialkyl dioxides (such as diethyl peroxide), hydrogen peroxide, persuccinic acid, lauryl peroxide, tetralin peroxide, urea peroxide, butyryl peroxide, benzoyl peroxide, alkali metal and alkaline earth metal and ammonium persulfates, perborates, percarbonates and the like. The amount of catalysts used may vary over a wide range from 0.1% by weight based on the ethylene upwards. Azo catalysts such as azodiisopropane; alpha, alpha' azodiisobutyronitrile; dimethyl alpha, alpha' azodiisobutyrate; 1,1'-azodi(cyclohexanecarbonitrile) may also be used.

The reaction, as has been stated, may be conducted with any polymerizable aliphatic mono olefinic hydrocarbon by which is meant one that can be converted to a polymer in the presence of the aforesaid and like catalysts, under the pressure and temperature conditions designated. Ethylene, propylene and isobutylene are the most prominent hydrocarbons of this class and of these the most important is ethylene.

The addition agents that can be introduced may be classified under three groups: the first group including those agents which do not appear to enter into the reaction although they markedly improve the product; the second group including those agents which interpolymerize with the ethylene and more particularly the organic compounds which are polymerizable, and the third group including those agents which do not appear to interpolymerize with the ethylene but do react therewith to form modified polymers (such as telomers) and/or high molecular weight products of ethylene.

The amount of the addition agent to be used will, of course, be determined by the type of addition agent used, the addition agents of the first group being used in amounts ranging from 0.025 to 5 parts thereof per part of the ethylene, the addition agents of the second group being used in amounts ranging as low as 5 to 10% of the ethylene up to greater than equal percentages by weight of ethylene and the agents of the third group being used in amounts ranging between 1 and approximately 10%.

The addition agents of the first group include water and such compounds as benzene, chlorobenzene, bromobenzene, and the halogenated benzenes generally, isooctane, and similar liquid addition agents which may be introduced into the reaction to improve the operation and/or the quality or yield of the products obtained.

The addition agents of the second group include such compounds as propylene, isobutylene, styrene and similar mono-olefinic hydrocarbons; it likewise includes unsaturated organic compounds such as the vinyl esters and more particularly as members of this group vinyl acetate, vinyl formate and the vinyl isobutyrates; and such unsaturated compounds such as acrylic, methacrylic, itaconic, crotonic, and fumaric acids as well as their esters, acid halides, amides, and anhydrides. Other closely related addition agents of this group include vinyl chloride, vinyl chloracetate, vinylidene chloride, vinyl cyanide and N-vinyl amides, vinyl ethers, divinyl butyral and methyl vinyl ketone.

The addition agents of the third group herein called telogens react with ethylene generally to the extent of one mol of the addition agent combining with a plurality of ethylene molecules. It is believed that the molecular structure of these addition agents break during the reaction, one part combining with one end of the ethylene chain and the other part combining with the opposite end of that chain. Compounds of this group include saturated organic compounds containing carbon, hydrogen, and oxygen, such for example as the saturated aliphatic or aromatic, cyclic, acyclic and alicyclic acids, esters, anhydrides, acetals, aldehydes, alcohols, ethers, and so forth; as well as the halogenated compounds such, for example, as the halogenated hydrocarbons as, for example, carbon tetrachloride, tetrachlorethylene, trichlorethylene, chloroform, and so forth.

In order to provide permanent, stable dispersions it is preferable to employ from about 0.5 to 5% of the dispersing agent by weight of the total emulsion. As dispersing agents may be used alkyl phenol-ethylene oxide condensation product (Triton, N=100), sorbitan monostearate-ethylene oxide reaction product (Tween 60), hydrocarbon sodium sulfonate (Alkanol WXN), sodium lorol sulfate, lorol pyridium chloride, polymethacrylic acid salts, soya lecithin, zirconyl stearate (1.5 zirconium to 2 stearic acid) and stenol, half ester of maleic anhydride-styrene condensation product and the like.

As media in which the dispersion may be carried out water is of the greatest importance and utility although organic liquids may be used such, for example, as xylene, benzene, toluene, kerosene and the like. The amount of media introduced prior to discharge of the emulsion to atmospheric pressure may be varied through wide limits, governed though it is, principally by the economics of the operation. Usually it is desirable to prepare a high solids content emulsion containing from about 20 to 50% or more solids, which upon discharge can be diluted to any desired concentration.

I claim:

1. In a continuous two-step process for the direct preparation of polymer-from-ethylene emulsions wherein an unemulsified polymer is obtained in the first step under pressures above 50 atmospheres, temperatures above 100° C. and in the presence of an ethylene polymerization catalyst, the second step which comprises introducing an emulsifying medium, and an emulsifying agent into the reaction mixture containing polymer, after its formation and prior to its pressure let-down to atmospheric pressure, and thereafter discharging to atmospheric pressure a permanent emulsion of the polymer in the emulsifying medium.

2. The process of claim 1 in which the polymer is a high molecular weight solid homopolymer of ethylene which is converted to an aqueous emulsion.

3. The process of claim 1 in which the polymer is an interpolymer of ethylene with another polymerizable organic compound which is converted to an aqueous emulsion.

4. In a continuous two-step process for the direct preparation of polymer-from-ethylene emulsions wherein unemulsified polymer is obtained in the first step under pressures above 50 atmospheres, temperatures above 100° C. and in the presence of an ethylene polymerization catalyst the second step which comprises introducing from 80 to 20% by weight of a dispersing medium, based on the weight of polymer and from 0.5 to 50% of an emulsifying agent based on the weight of emulsifying medium into the reaction mixture containing polymer, after its formation and prior to its pressure let-down to atmospheric pressure, forming a permanent emulsion and thereafter discharging to atmospheric pressure a permanent emulsion of the polymer in the emulsifying medium.

5. The process of claim 4 in which the polymer is a high molecular weight solid homopolymer of ethylene which is converted to an aqueous emulsion.

6. The process of claim 4 in which the polymer is an interpolymer of ethylene with another polymerizable organic compound which is converted to an aqueous emulsion.

ALFRED T. LARSON.